March 16, 1937.  A. L. KNAPP  2,073,874
MOTOR VEHICLE
Filed April 24, 1933  2 Sheets-Sheet 1
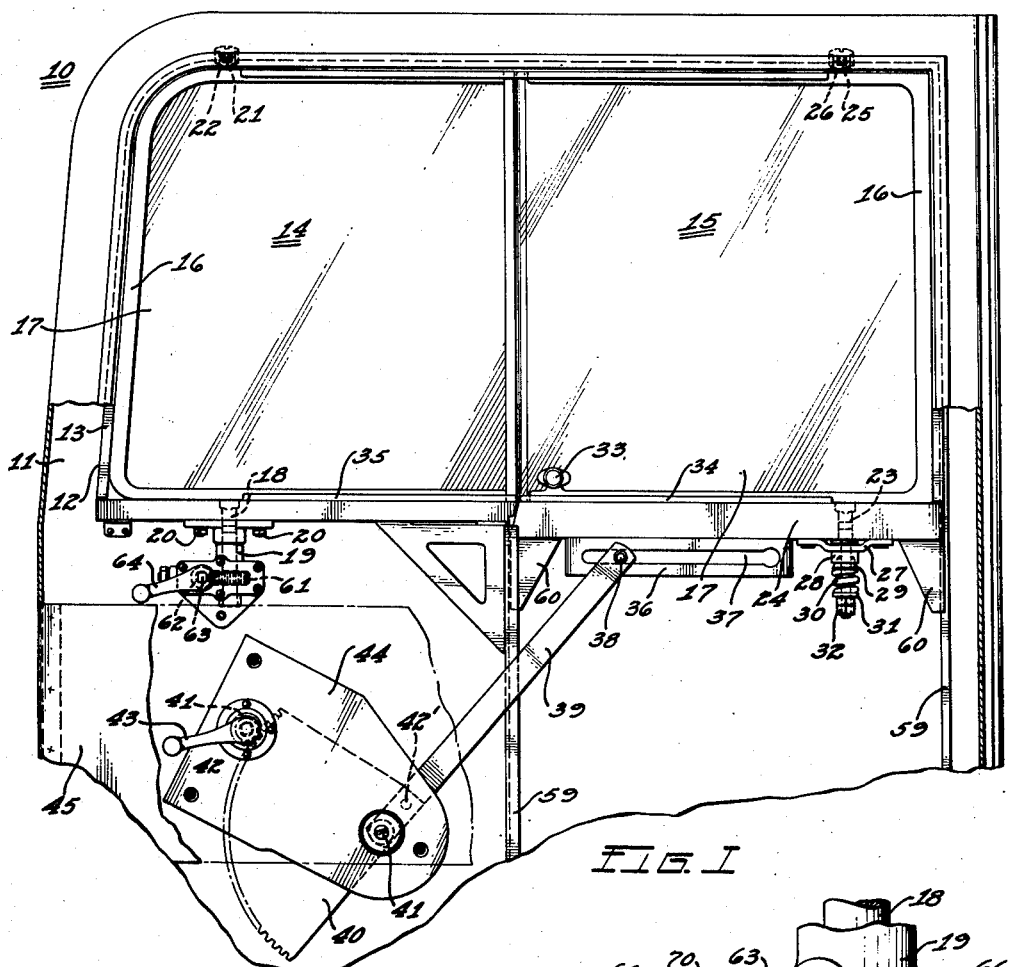
Inventor
ARCHER L. KNAPP.
By Milton Tibbets
Attorney

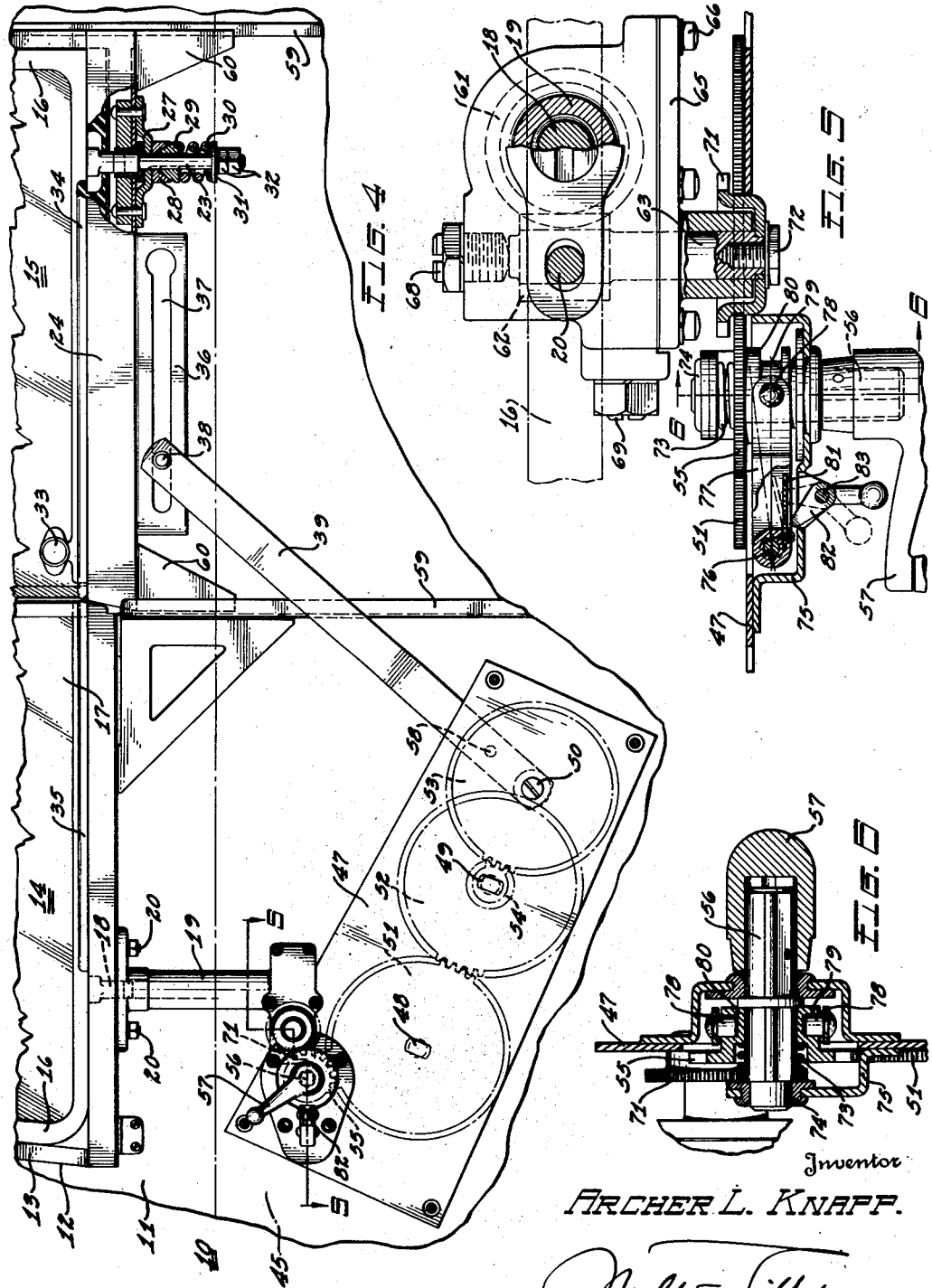

Patented Mar. 16, 1937

2,073,874

UNITED STATES PATENT OFFICE 2,073,874

MOTOR VEHICLE

Archer L. Knapp, Detroit, Mich., assignor to Packard Motor Car Company, Detroit, Mich., a corporation of Michigan Application April 24, 1933, Serial No. 667,596

15 Claims. (Cl. 296—44)

This invention relates to motor vehicle bodies and more particularly to window structure and mechanism for adjusting the same.

An object of the invention is to provide a closed vehicle body having a window structure formed in sections which are movable through a pair of mechanisms operable from a single actuator to rotate one of the sections about a vertical axis and to raise and lower the other section.

Another object of the invention is to provide a sectional window construction for closed motor vehicle bodies with mechanism whereby one of the sections can be rotated and the other section can be raised, lowered or moved about a vertical axis in order to ventilate the body without causing drafts.

A further object of the invention is to provide a window construction for motor vehicle bodies which can be raised and lowered by cranked mechanism, or rotated about a vertical axis through the application of force directly thereto.

Still another object of the invention is to provide a shiftable actuator mechanism which can be selectively applied to rotate one window section or to raise and lower another window section.

Other objects of the invention will appear from the following description taken in connection with the drawings, which form a part of this specification, and in which:

Fig. 1 is a side elevational view of a portion of the door for a motor vehicle, partly broken away and partly in section, having my invention incorporated therewith;

Fig. 2 is a fragmentary side elevational view of one of the window mechanism actuators having the crank removed and illustrating the adjustability to take up slack in the gearing;

Fig. 3 is a sectional view of one of the mechanisms for operating a window section taken on line 3—3 of Fig. 2;

Fig. 4 is a fragmentary elevational view of a door and window structure showing another form which the invention can take;

Fig. 5 is a sectional view taken on line 5—5 of Fig. 4;

Fig. 6 is a sectional view taken on line 6—6 of Fig. 5.

Referring now to the drawings by characters of reference, 10 indicates generally a front door for one side of a closed body of a motor vehicle in which there is a panel 11 formed with an opening 12 which is surrounded by a window casing 13. Within the window casing is located a window structure which consists preferably of a front section 14 and a rear section 15. Each window section includes a frame 16 carrying a glass 17.

The front section of the window structure has fixed to the bottom frame portion thereof a pintle 18 which projects into a casing 19 secured by bolts 20 to the under side of the casing. Arranged in axial alignment above the pintle 18 is another pivotal connection which consists of a spring pressed plunger 21 carried by the door and a recess 22 in the upper wall of the frame of the section which is arranged to receive the plunger. The rear section of the window structure has a pintle 23, fixed to the bottom portion of the frame, which projects through a support 24 adapted to be raised and lowered vertically. In axial alignment above the pintle 23 is a pivotal connection which includes a spring plunger 25 carried by the door and a recess 26 formed in the top of the frame of the rear window section in a relation to receive the plunger. The front and rear sections of the window structure are movable about vertical axes extending through the pintles and the top connections.

The pintle 23 projects through a bracket 27 secured to the under side of the supporting member 24 and on the pintle 23 is mounted one section 28 of a friction clutch. The other section 29 of the friction clutch is keyed to the pintle 23 and is held in frictional engagement with the member 28 through means of a coil spring 30 which is held in compression by means of a washer 31 and nuts 32 which encircle the lower end of the pintle 23. Through the provision of this cone clutch structure, consisting of the elements 28 and 29, and the spring 30, the rear section of the window structure can be pushed or pulled laterally by the application of direct force about a vertical axis and relative to the vertically adjustable support 24. A knob 33 is fixed to the frame of the rear window section in order that an occupant of the vehicle body can readily grasp the same to move the window about its vertical axis. In order to limit the movement of the rear window section in one direction about its vertical axis, the raising and lowering support member 24 has associated therewith an upstanding flange 34.

The lower sash member is provided with a flange 35 to limit the rotation of the front window section in one direction. When the window frames engage the flanges 34 and 35, the window opening will be closed and the windows will be in alignment longitudinally of the vehicle body.

Manually operable mechanism is associated with the support 24, in both embodiments of the invention, for raising or lowering the rear section of the window. An extension 36 projects downwardly from the supporting member 24 and is provided with a longitudinally extending slot 37 through which extends a pin 38. Pivotally mounted on the pin 38 is an arm 39 which is utilized as the actuator for moving the pin in the slot in a camming relation with the extension 36 to raise and lower the member 24.

In Fig. 1, I have shown mechanism for actuating the arm 39 which consists of a gear sector 40 adapted to be driven by a gear 41 fixed on a shaft 42 carrying at its inner end a crank 43. The sector and the arm 39 are mounted on a shaft 41 and the arm is also pinned to the sector, as indicated at 42'. The shafts 42 and 41 are carried by a plate 44 which is fixed to a lock board 45 extending across the interior of the door. Rotation of the crank 43 will rotate the shaft 42 and the gear 41 whereby rotating the sector and moving the arm 39 therewith. Movement of the arm 39 with the sector causes it to rock and thereby raise and lower the supporting member 24, it being understood that the slot 37 permits the arm to rock and at the same time cause the pin 38 to move the supporting member up or down depending upon the direction in which the crank 43 is rotated.

In Fig. 4, the arm 39 is operated to raise and lower the supporting member 24 by means of mechanism which is somewhat different from that shown for operating the same arm in Fig. 1. In this instance, there is a plate 47 attached to the lock board 45 to provide a support for shafts 48, 49 and 50 having gears 51, 52 and 53, respectively, mounted thereon. The gear 51 meshes with the gear 52 and on the shaft 49 is another gear 54 which meshes with the gear 53. The gear 51 is driven by an actuator gear 55 mounted on a shaft 56 carried by the plate 47 and having on the inner end thereof a crank 57. When the gear 55 meshes with the gear 51, the train of gears is driven and such movement will rock the arm 39 because it is fixed to the gear 53 by a pin, as indicated at 58. The arm is free to slide back and forth in the slot 37 of the supporting member extension and thus has a camming action on the extension to raise and lower the supporting member 24. Strips 59 are fixed to the door and serve as guides for the extensions 60 depending from the supporting member 24.

Similar mechanism is provided for swinging the front window section about its vertical axis in both forms of the invention, however, the actuator mechanism is slightly different in Fig. 4 from that shown in Fig. 1. The pintle 18 extends into the housing 19, as previously described, and fixed to the pintle within the housing is a worm gear 61. Associated with the worm gear is a worm 62 fixed to a shaft 63 on the end of which is fixed a crank 64. Obviously, rotation of the crank will transmit similar motion to the pintle 18 through means of the gears 62 and 61. It will thus be seen that we have a separate mechanism which is cranked to rotate the front window section to regulate its angularity and we have another cranked mechanism for raising and lowering the rear section of the window. The rear section can be swung about its vertical axis by the application of pressure directly thereto. It will be noted that the front window section can be adjusted about its vertical axis irrespective of the vertical adjustment of the rear window section.

The housing 19 has a cover plate 65 attached thereto by means of bolts 66 for enclosing the gears 61 and 62. This cover plate is provided with a bearing portion 67 through which the shaft 63 extends and the worm 62 is held in desired axial relation by means of an adjustable screw member 68 which extends through the casing 19 and abuts the inner end of the shaft 63. This adjustment of the shaft can be utilized to take up slack between the gears 61 and 62. In addition to such slack take-up means, the cover 65 is adjustable laterally so that the adjusting member 69 can move the same in a direction to cause the worm 62 to properly mesh with the gear 61 whereupon the screws 66 can be tightened to maintain the relation of the gears. This adjustment is made possible through slotting of the cover member, as indicated at 70. In this manner, I am able to compensate for any wear which may take place between the gears 61 and 62 as well as to properly relate the gears when they are assembled.

In the construction shown in Fig. 4, the same actuator which meshes with the gear train for raising and lowering the rear window section is utilized to engage a gear 71 fixed to the shaft 63 by means of a bolt 72. In this instance, there is no crank associated with the shaft 63 but the gear 71 is driven by the gear 55.

The gear 55 is movable axially and is normally held in position to mesh with the gear 51 by means of a coil spring 73 which engages a bearing 74 fixed to one end of the housing 75 and the gear structure at its other end. Shift mechanism is associated with the gear by means of which it can be moved against the force of the spring into meshing relation with the gear 71. Pivotally mounted upon a shaft 76 fixed in the housing 75 is a yoke 77 carrying a pair of fingers 78 which engage in a groove 79 formed in an extension 80 of the gear 55. This yoke has fixed thereto a stiff leaf spring 81 which is engageable by a cam or trigger lever 82 pivotally mounted on a pin 83 carried by the casing 75. This cam mechanism is arranged so that it can be tripped by the operator while his hand is maintained on the actuator crank 57. The trigger lever 82, when shifted on its pivot has a cam action relation with the leaf spring 81 and, through such contact, it shifts the yoke 77 back or forth to move the gear 55 axially upon the shaft 56 to which it is keyed. The reason for employing the leaf spring 81 is to provide an automatic means for moving the gear 55 into meshing relation with the gear 71 in case the teeth do not interfit upon the initial shifting operation. In other words, if the gear 55 is to be moved into meshing relation with the gear 71, the handle portion of the trip lever is moved to the left, as viewed in Fig. 5, thus moving the cam portion thereof to the right and moving the leaf spring 81 forwardly. Such movement of the leaf spring carries the yoke 77 therewith and will mesh the gear 55 with the gear 71 provided the teeth are in meshing relation. If the teeth are not in meshing relation, the spring 81 continues to exert pressure against the yoke and will force the gear 55 to mesh the gear 71 upon slight rotation of either one, the tension of the spring 81 being greater than that of the spring 73 when the cam is applied thereto. When the trigger lever is released, the spring 73 will automatically move the gear 55 out of mesh with the gear 71 and back into mesh with the gear 51.

It will be seen that the actuator gear 55 can be selectively associated with the mechanism for raising and lowering the rear window section or it can be associated with the mechanism for rotating the front window section about its vertical axis and thus only one actuator means needs to be employed to operate both mechanisms. With the mechanism herein described, the front section can be operated by cranked mechanism to take a desired angular position for ventilating the interior of the vehicle body. The rear window section can likewise be adjusted angularly when the raising and lowering supporting member 24 is in its uppermost position, and thus we see that the rear window section can be raised, lowered or moved about a vertical axis to ventilate the interior of the vehicle body. In one type of device, there are individual actuators for the rotating and raising and lowering mechanisms and, in another form of the invention, there is an individual actuator which can be selectively applied to operate either the window rotating mechanism or the raising and lowering mechanism. Such window adjustment thus provides various forms of openings for advantageously ventilating the interior of the vehicle body without causing drafts.

Although the invention has been described in connection with a specific embodiment, the principles involved are susceptible of numerous other applications which will readily occur to persons skilled in the art. The invention is therefore to be limited only as indicated by the scope of the appended claims.

What I claim is:

1. In a window structure, a casing, a pair of window frames separately mounted in the casing, mechanism for vertically reciprocating one of the window frames, mechanism for rotating the other window frame, and a single actuator for both mechanisms.

2. In a window structure, a casing, a pair of longitudinally aligned window frames in the casing, raising and lowering mechanism, one of the window frames being pivotally carried by said mechanism and swingable on a vertical axis, mechanism for rotating the other window frame on a vertical axis, and a single actuator for both mechanisms.

3. In a window structure, a casing, a pair of longitudinally aligned window sections in the casing, mechanism for raising and lowering one of the window sections including a gear train, mechanism for rotating the other window section including gear means, and a crank operated gear adapted to be selectively engaged with either the gear train or the gear means.

4. In a window structure, a casing, a pair of longitudinally aligned pivoted window sections in the casing, mechanism operable to vertically adjust one of the window sections, and mechanism operable to rotate the other window section, said vertically adjustable window section being swingable on its pivot by the application of directly applied force.

5. In a window structure, a casing, a pair of longitudinally aligned pivoted window sections in the casing, mechanism including gear means for adjusting one of the window sections vertically, mechanism including gear means for swinging the other window section about its pivot, a manually operable actuator gear shiftable into driving engagement with either of the gear means, and means normally urging the actuator gear into driving engagement with the gear means of the mechanism for vertically adjusting the window section.

6. In a window structure, a casing, a pair of pivoted window sections in the casing, mechanism including gear means for vertically adjusting one of the window sections, mechanism including gear means for swinging the other window section on its pivot, a manually rotatable gear shiftable into meshing relation with either gear means, and shifter means associated with said gear.

7. In a window structure, a casing, a pair of pivoted window sections in the casing, mechanism including gear means for vertically adjusting one of the window sections, mechanism including gear means for swinging the other window on its pivot, a shaft, a crank fixed to the shaft, and a gear shiftable axially on the shaft into mesh with either of said gear means.

8. In a window structure, a casing, a pair of pivoted window sections in the casing, mechanism including gear means for vertically adjusting one of the window sections, mechanism including gear means for swinging the other window section on its pivot, a shaft having a crank fixed thereto, a gear slidable on the shaft and mounted to be rotated therewith, a spring engaging the gear urging it into mesh with the gear means in the mechanism for vertically adjusting the window section, and shifter means extending adjacent the crank for moving the gear into mesh with the gear means in the mechanism for swinging the window section.

9. In a window structure, a casing, a pair of pivoted window sections in the casing, mechanism including gear means for vertically adjusting one of the window sections, mechanism including gear means for swinging the other window section on its pivot, a crank driven shaft, an actuator gear slidable on and driven by said shaft, resilient means urging said gear actuator into mesh with one of said gear means, a yoke for shifting said gear actuator, and resilient cam means associated with the yoke and operable to shift the gear actuator into mesh with the other gear means, said cam means including a trigger adjacent the crank and readily engageable by the hand of an operator while engaging the crank.

10. In a window structure, a casing, a pair of window sections in the casing, mechanism including gear means for vertically adjusting one of the window sections, mechanism including gear means for swinging the other window section on its pivot, a shiftable gear actuator engageable with either gear means, a coil spring urging the actuator into engagement with one of said gear means, a pivoted shifting yoke associated with the actuator, a leaf spring fixed to the yoke, and manually operable cam means engageable with the leaf spring to hold the actuator in engagement with the other gear means under a force greater than that exerted by said coil spring.

11. In a window structure, a window casing, a pivoted window in the casing, mechanism including a pair of gears for rotating said window about its pivot, a casing, shafts carried by the casing on which the gears are fixed, one of said shafts being adjustable axially and laterally, and a crank for rotating the adjustable shaft.

12. In a window structure, a pair of window carriers mounted to be moved separately in different planes, mechanism for slidably adjusting one of the carriers, mechanism for rotatably adjusting the other carrier, and means adapted to selectively actuate either mechanism.

13. In a window assembly for an automotive vehicle, a window opening, a window well associated therewith, a pair of panels for closing the window opening, one of said panels closing a portion of the window opening and being swingable about an up and down axis, the other of said panels closing the remaining portion of the window opening and being movable into and out of the window well, and an operating device optionally connectible at all times with one or the other of said panels for adjusting the same regardless of the position to which either of said panels may be adjusted.

14. In a window assembly for an automotive vehicle, a window opening, a window well associated therewith, a pair of panels for closing the window opening, one of said panels closing a portion of the window opening and being swingable about an up and down axis, the other of said panels closing the remaining portion of the window opening and being movable into and out of the window well, and a regulator for adjusting the swingable panel, a regulator for adjusting the movable panel, and means including a crank handle and spindle axially shiftable to in and out position to optionally connect the crank handle with one or the other of said regulators to adjust one or the other of said panels.

15. In a window assembly for an automotive vehicle, a window opening, a window well associated therewith, a pair of panels for closing the window opening, one of said panels closing a portion of the window opening and being swingable about an up and down axis, the other of said panels closing the remaining portion of the window opening and being movable into and out of the window well, and a regulator for adjusting the swingable panel, a regulator for adjusting the movable panel, and a train of gears continuously operatively connected with one of said regulators, a second train of gears operatively connected with the other of said regulators, and a crank handle optionally connectible with one or the other of said trains of gears for adjusting one or the other of said panels.

ARCHER L. KNAPP.